US007003654B2

(12) United States Patent
Baron

(10) Patent No.: US 7,003,654 B2
(45) Date of Patent: Feb. 21, 2006

(54) TIME-BASED INITIALIZATION DEFAULTS FOR AN ELECTRONIC INFORMATION RETRIEVAL DEVICE

(75) Inventor: John M. Baron, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 666 days.

(21) Appl. No.: 09/931,141

(22) Filed: Aug. 16, 2001

(65) Prior Publication Data

US 2003/0037229 A1 Feb. 20, 2003

(51) Int. Cl.
*G06F 9/24* (2006.01)

(52) U.S. Cl. .......................................... 713/1; 718/102

(58) Field of Classification Search .................... 713/1, 713/2, 100, 300, 340; 707/1, 6; 711/100; 718/100, 102, 103
See application file for complete search history.

(56) References Cited

U.S. PATENT DOCUMENTS 5,159,163 A * 10/1992 Bahjat et al. ............... 187/381
5,500,897 A * 3/1996 Hartman, Jr. ............... 713/178
5,892,503 A * 4/1999 Kim ........................... 345/168
5,930,501 A 7/1999 Neil ........................... 395/551
6,195,569 B1 * 2/2001 Frederiksen ................ 455/566
6,263,359 B1 * 7/2001 Fong et al. ................. 718/103
6,574,617 B1 * 6/2003 Immerman et al. ............ 707/1
6,583,797 B1 * 6/2003 Roth .......................... 345/810
6,651,095 B1 * 11/2003 Barlock et al. ............. 709/223

FOREIGN PATENT DOCUMENTS

WO WO 00/39978 7/2000
WO WO 01/17209 3/2001

OTHER PUBLICATIONS

IBM Technical Disclosure Bulletin—"Dynamic Time-Dependent User Interface Modification"—Jan. 1994—vol. 37, Issue 1, pp. 287-290.*

* cited by examiner

*Primary Examiner*—Thuan Du

(57) ABSTRACT

An electronic information retrieval device includes a time source, a communication interface capable of communicating with one or more external devices, and at least one I/O device. The electronic information retrieval device further includes a memory storing a plurality of time values and storing a corresponding plurality of time-based initialization default values. The electronic information retrieval device obtains a current time value from the time source upon initialization of the device, compares the current time value to the plurality of time values, retrieves a corresponding particular time-based initialization default value from the plurality of time-based initialization default values, and uses the particular time-based initialization default value in the initialization.

23 Claims, 3 Drawing Sheets

TIME-BASED INITIALIZATION DEFAULTS FOR AN ELECTRONIC INFORMATION RETRIEVAL DEVICE

FIELD OF THE INVENTION

The present invention relates generally to a default information retrieval value employed in an electronic information retrieval device, and more particularly to a method using time-based initialization default values in electronic information retrieval devices.

BACKGROUND OF THE INVENTION

Many electronic information retrieval devices are controlled by humans for purposes of entertainment and information. One example is an information retrieval system, such as an Internet browser running on a computer, which can be used to retrieve entertainment and information, including news, weather information, stock information, etc. Another example is an entertainment device where a user selects channels or frequencies for receiving video and audio entertainment and information, such as a television or radio system.

A problem that exists in information retrieval devices of the prior art is that when such a device is initialized, the device generally uses a default value to retrieve specific information upon start up in advance of receiving a human input. The default value is therefore a first value used upon initialization, and is employed by a device designer in a guesswork attempt to anticipate a user's desires.

The prior art default value is generally chosen during manufacture of the device. Alternatively, it may be manually selected by the user, as in the case of a default Internet home page, or may be a last-used value. For example, when a user starts his or her computer and accesses the Internet, an Internet session is initialized by loading a home page default. In the prior art, the default browser home page is either a single address set by the user or is a last website visited by the user. Similarly, when the user turns on a television or turns on a cable television set-top box, the device tunes to the last television channel viewed by the user. Therefore, the prior art approaches to default values are generally either to set one default value or to just recall a last-used value. Therefore, the prior art approach allows only a single default and requires the user to manually change the default value if a new default is desired.

However, the prior art approach is not very flexible and does not reflect the user's wishes. The user may have varying needs and requirements according to the time of day, the day of the week, etc. Therefore, the typical prior art default does not follow the user's habits, and does not allow multiple defaults. Furthermore, the typical prior art default is not time-based, which is often predictive of user behavior. For example, a user who accesses the Internet upon arriving to work in the morning will generally access a website that is different from what the user may access at lunch time or at home after work, for example.

What is needed, therefore, are improvements to electronic devices employing default values.

SUMMARY OF THE INVENTION

An electronic information retrieval device comprises a real time source (clock), a communication interface capable of communicating with one or more external devices, at least one I/O (input/output) device, and a memory storing a plurality of time values and storing a corresponding plurality of time-based initialization default values. The electronic information retrieval device obtains a current time value from the time source upon initialization of the device, compares the current time value to the plurality of time values, retrieves a corresponding particular time-based initialization default value from the plurality of time-based initialization default values, and uses the particular time-based initialization default value in the initialization.

DETAILED DESCRIPTION

Figure 1:
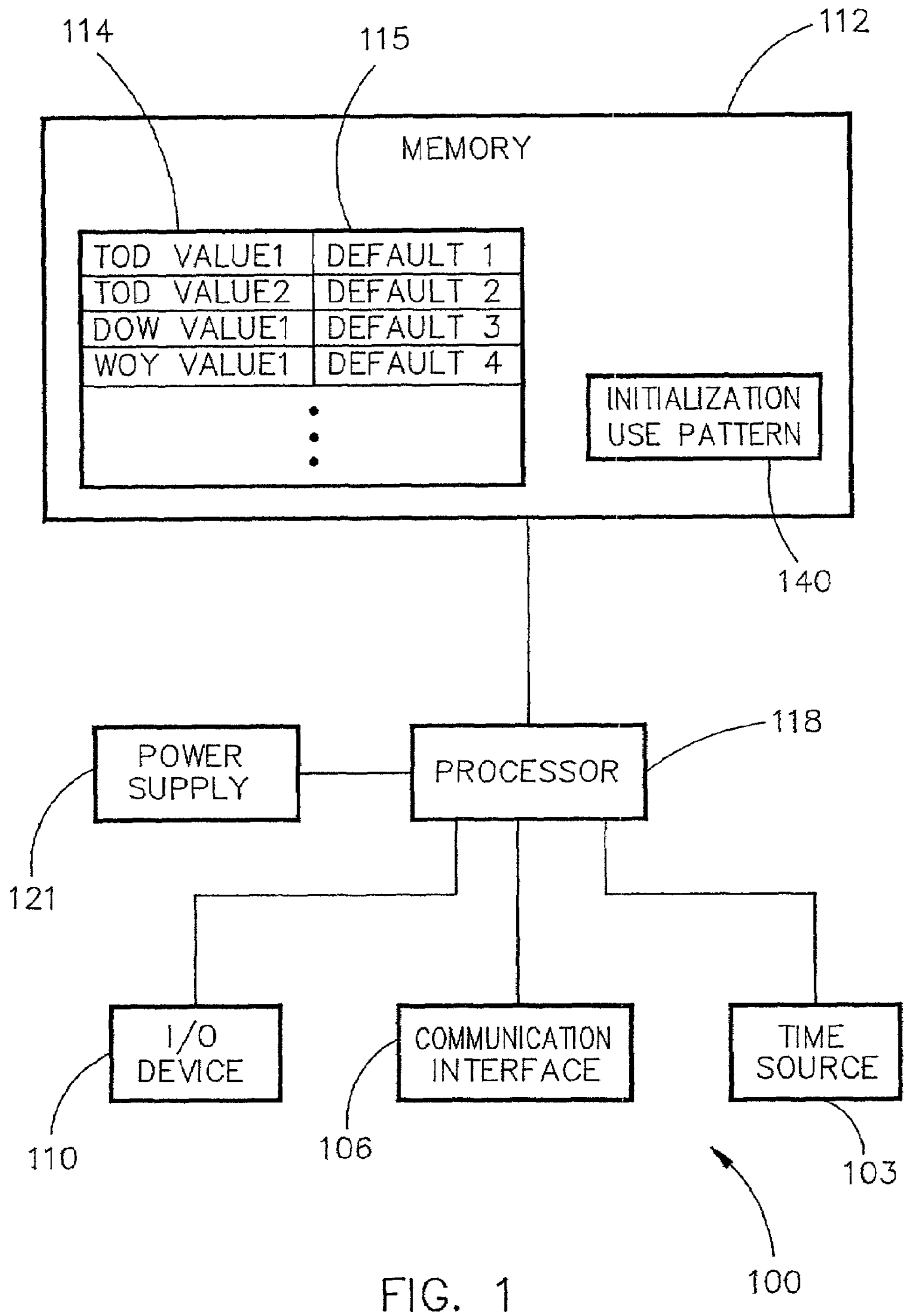
FIG. 1 is a block diagram of an electronic information retrieval device according to one embodiment of the invention.

FIG. 1 is a block diagram of an electronic information retrieval device 100 according to one embodiment of the invention. The electronic information retrieval device 100 may include a time source 103, an interface 106, at least one I/O device 110, a memory 112, a processor 118, and a power supply 121.

The time source 103 may be any type of time source capable of providing real time information to the processor 118. The time information may include a running absolute time, a time-of-day, including minutes, hours, seconds, a time of week, or a week of the year. The time source 103 may be a clock, counter or timer integrated into the processor 118, or may be an external device. The time source 103 may generate the time signal itself or may be merely an interface to an external time source. For example, if the electronic information retrieval device is a PC or work station on a computer network, the computer network may be a local area network (LAN), a wide area network (WAN), virtual private network (VPN), etc. The electronic information retrieval device may therefore have access to a time source available to all devices on the network. Alternatively, if the electronic information retrieval device is a cable set top box, for example, a time information or time signal may be provided over the television cable or may be obtained from other sources, such as for example, a satellite-based time signal.

The interface 106 may be any type of communication interface capable of communicating with an external device 107. For example, the interface 106 may be a modem that communicates over a standard public switched telephone network (PSTN). Alternatively, the interface 106 may be a network card that enables the electronic information retrieval device 100 to communicate with other computers or computer devices. The communication may be over a computer network 301, such as a LAN, a WAN, a VPN, or the Internet, for example. In addition, the interface 106 may communicate in a wireless fashion with other wireless devices, such as with a cellular or satellite telephone network, for example. In addition, the interface 106 may be a television interface, such as a television receiver. Alternatively, the interface 106 may be a cable television interface capable of sending and/or receiving data over a television cable.

The at least one I/O device 110 allows the processor 118 to output data to a user and allows the user to input data and/or commands to the processor 118. The at least one I/O device 110 may include any manner of input or output devices, including a keyboard, a mouse, a floppy disk drive, etc. Furthermore, the at least one I/O device 110 may include output screens, touch screens, and analog input devices, such as knobs, dials, switches, etc.

The memory 112 may be any type of memory, including all types of random access memory (RAM), read-only memory (ROM), magnetic storage media such as magnetic disc, tape, etc., or optical or bubble memory. The memory 112 may store, among other things, a plurality of time values 114, a corresponding plurality of time-based initialization default values 115, and an optional initialization use pattern 140. The plurality of time values 114 may be used to select a default value from the plurality of default values 115 for use by the information retrieval device upon initialization. The plurality of time values 114 may include a time-of-day, day of week, week of the year, a solar time (i.e., a time from sunrise or a time before sunset), and various combinations thereof. In addition, the memory 112 may store a software program to be executed by the processor 118.

The processor 118 may be any type of general purpose processor. The processor 118 executes a control routine contained in the memory 112. In addition, the processor 118 receives inputs and controls an initialization process. Initialization can occur when electrical power is provided from the power supply 121, such as a power up of the electronic information retrieval device 100. Alternatively, the initialization can occur as a result of a user input through the at least one I/O device 110, such as a selection of a software application in a personal computer, for example.

When the processor 118 determines that an initialization is occurring, the processor receives a current time value from the time source 103 and compares the current time value to the plurality of time values 114. The plurality of time values 114 may include a time-of-day (TOD), day of week (DOW), week of the year (WOY), a solar time, etc., and various combinations thereof. A match is found if the current time matches to a specific time value or if it falls within a time range, for example. Upon a match, a corresponding time-based initialization default value is obtained from the plurality of default values 115 and is used by the processor 118 during the initialization process.

In some cases, the current time may not uniquely match to a time value or range 114 in the memory 112. For example, the plurality of time values 114 may comprise overlapping time ranges or overlapping time values. Range A might be 8:00 A.M. to 10:00 A.M. on Tuesdays, while range B might be weekday mornings, including Tuesday mornings. Therefore, when a unique match does not exist, a time range may be selected that has a center value that is nearest to the current time or that has a smaller size (i.e., the most specific time value 114). Alternatively, the time values 114 may be arranged in a priority order, and the first matching time value may therefore be selected. One priority order may be according to a time format (ie., week-of-year first, day-of-week second, etc.). As another alternative, the electronic information retrieval device 100 may select a time range that is given the greatest importance by the user (the plurality of time values 114 may additionally include a weighting number). However, the electronic information retrieval device 100 may alternatively discard or modify a time value 114 to prevent overlap with other time values 114.

The initialization may be an initialization of the electronic information retrieval device at a power-up of the device. The power-up may be initiated by the provision of electrical power from an internal or external power supply. Alternatively, the initialization may be the initialization of any software application running on the electronic device.

For example, at an initialization of a web browser, the default home page may be chosen based on a current time of day, a current day-of-week, week-of-year, time-from-sunrise, etc. The resulting time-based initialization default value may be, for example, a Uniform Resource Locator (URL), or may be some other form of computer-based address, such as a network address, an IP address, etc. The time-based initialization default value is used to access a default homepage (Internet website) based on a current time.

In another example, the time-based initialization default value may be used to determine an application to be activated, based on the current time. Therefore, in a business environment, if a particular computer or software application is activated in the morning, it may bring up an accounting application or spreadsheet. If it is activated in the afternoon, it may initialize and bring up a word processor, for example.

In yet another example, for a radio, television, or cable television set-top box device, the power-up initialization may include selection of a channel to be received. This may include selecting a channel category if a cable television provides channel category information that divides channels into like groupings (i.e., a grouping of sports channels, etc.). The channel category may be a television weather channel category or a radio pop music format, for example. Furthermore, in a radio embodiment, the time-based initialization default value may be a channel preset value.

The time-based initialization default value may be used to communicate with external devices and may be used to retrieve remote information. The initialization process may include retrieving information from an external device through the interface 106. The information may include any manner of entertainment information, educational information, news information, etc. The time-based initialization default value may be used to access either local information (i.e., in the memory 112) or may be used to retrieve information data from external devices.

In an additional advantageous feature, the electronic information retrieval device 100 may be capable of learning a time-based initialization default value. The learning capability eliminates the need for a programming action by the user and yet still allows the electronic information retrieval device to accommodate the user's needs. Each time that the user activates or uses a feature/application that employs a time-based initialization default value according to the invention, an entry may be accrued in the initialization use pattern 140. The initialization use pattern 140 may therefore record user actions and may dictate a change in a time-based initialization default value as part of a learning feature. For example, if a web browser according to the invention is set up to default to URL A if activated between 8:00 A.M. and 10:00 A.M., and the initialization use pattern 140 shows that the user has repeatedly gone immediately to URL B at initialization, after a certain number of consistent repetitions the appropriate time-based initialization default value may be changed to URL B.

Alternatively, the time-based initialization values may be directly user-programmable, such as through a set-up screen or through a "set" or "learn" button or other input device available to the user.

Figure 2:
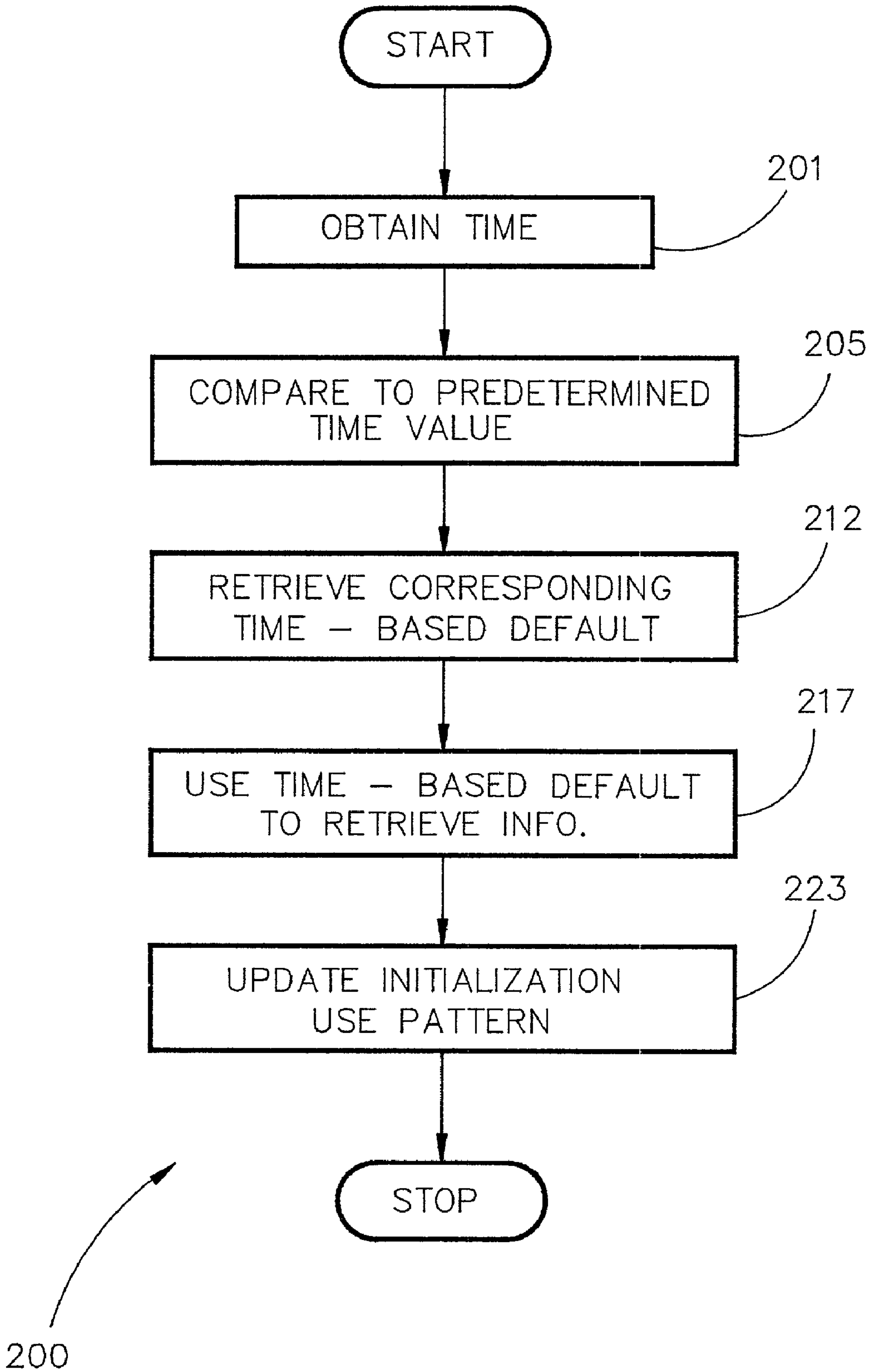
FIG. 2 is a flowchart of a computer-implemented default initialization method according to another embodiment of the invention.
Figure 3:
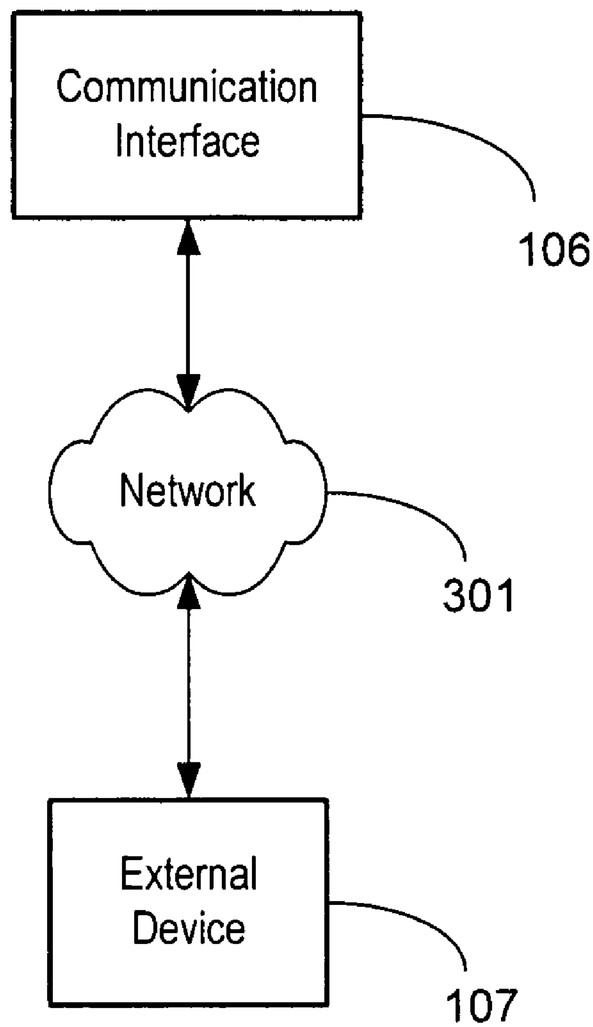
FIG. 3 is a block diagram showing interface 106 being coupled to an external device 107 through a network 301.

FIG. 2 is a flowchart 200 of a computer-implemented default initialization method according to another embodiment of the invention. In step 201, a current time is obtained. The current time may be obtained from a time source, such as a clock or counter. Alternatively, other time sources may be used, such as an external time source, as previously discussed.

In step 205, the current time is compared to a plurality of stored time values 114 to see if the current time matches one of the stored time values 114. The stored time values 114 may be specific time values or may be time value ranges, such as for example, an inclusive time range between 1:00 P.M. and 2:00 P.M.

In step 212, a particular time-based initialization default value is retrieved if the current time value matches one of the plurality of time values 114. The match indicates that the current time is linked to a particular time-based initialization default value 115. In this step, as previously discussed, the method may perform an arbitration if there is any overlap between time values 114.

In step 217, the particular time-based initialization default value 115 is used in the initialization method as an information retrieval value. The information retrieval value may be an address, such as a memory address or URL, for example. Alternatively, the information retrieval value may be some other value, such as for example, a television or radio channel (i.e., a frequency selection). After completion of the time-based initialization default operation, the electronic information retrieval device 100 may proceed with regular operation.

In optional step 223, the initialization use pattern 140 may be updated or reinforced by the use of the particular time-based initialization default value 115.

In any of the various embodiments, the information retrieval value may be used in the initialization process in order to retrieve information. Therefore, in an Internet browser embodiment, for example, the particular time-based initialization default value may be used to select a default home page. Depending on the current time, such as a current time-of-day, day of week, week of the year, or solar time, the Internet browser will go to a particular Internet website or webpage.

In application, this may mean a user may receive a different default homepage depending on the current time. Therefore, the user may see a news report in the morning, may see a sports or stock homepage in the afternoon, and may see a default homepage of an entertainment site in the evening, for example. Of course, the user remains free to change the information retrieval value at any time after initialization has been completed.

Furthermore, the method may include an optional step of learning a new time-based initialization default value. For example, if the electronic information retrieval device contains a default value for, say 8:00 A.M. to 10:00 A.M. daily, and if the user visits a new site frequently, the default value may be switched to a most frequently visited site. Alternatively, of course, the computer implemented method may include a button or other selection indicia that allows the user to reset the time-based default upon a simple click.

The device and method according to the invention provides a user with several benefits. One benefit is that the user may employ more than one initialization default. Another benefit is that the user may select the number of desired defaults and may configure them as desired. In addition, the user can override any existing time-based defaults and establish new time-based defaults, including automatically overriding existing time-based defaults merely by using the electronic information retrieval device 100. The time-based default streamlines the use of the electronic information retrieval device 100 and eliminates the need for as many initialization choices or actions by the user.

I claim:

1. An electronic information retrieval device that is connected to a network, comprising:

a time source;

at least one output device;

a memory storing a web browser, a plurality of time values and a corresponding plurality of resource locators; and a processor communicating with said time source, said at least one output device, and said memory;

wherein said processor obtains a current time value from said time source upon initialization of said web browser, compares said current time value to said plurality of time values to determine whether a match exists, retrieves a particular resource locator from said memory based on the result of said comparison, and configures the web browsers to use said particular resource locator to retrieve a web page corresponding to the resource locator from an external device connected to the network.

2. The electronic information retrieval device of claim 1, wherein a predetermined time value of said plurality of time values includes a time-of-day value.

3. The electronic information retrieval device of claim 1, wherein a predetermined time value of said plurality of time values includes a day-of-week value.

4. The electronic information retrieval device of claim 1, wherein a predetermined time value of said plurality of time values includes a week-of-year value.

5. The electronic information retrieval device of claim 1, wherein a predetermined time value of said plurality of time values includes a solar time value.

6. The electronic information retrieval device of claim 1, further comprising a user input device and wherein a user input triggers said initialization.

7. The electronic information retrieval device of claim 1, wherein said electronic information retrieval device further comprises a power supply and wherein said initialization occurs when said power supply first provides electrical power to said electronic device.

8. The electronic information retrieval device of claim 1, wherein said memory stores an initialization use pattern that records (1) a user's actions and (2) time of day information that identifies the time period in which the action occurred.

9. The electronic information retrieval device of claim 1, wherein said plurality of time values and said plurality of resource locators are user-settable.

10. The electronic information retrieval device of claim 1, wherein said particular resource locator comprises a network address of an external device.

11. The electronic information retrieval device of claim 10, wherein said particular resource locator further comprises an information identifier identifying information stored at said external device.

12. The electronic information retrieval device of claim 1, wherein said web page includes sports, weather, stock, entertainment, and/or news information.

13. The electronic information retrieval device of claim 1, wherein said particular resource locator is a Uniform Resource Locator (URL).

14. An electronic information retrieval device, comprising:

a time source;

at least one output device;

a memory storing (a) a plurality of time values, (b) a corresponding plurality of time-based initialization default values, and (c) an initialization use pattern, that records (1) a user's actions and (2) time of day information that identifies the time period in which the action occurred, wherein at least one of said plurality of time-based initialization default values learned from said initialization use pattern; and a processor communicating with said time source, said at least one output device, and said memory;

wherein, upon initialization of the electronic information retrieval device, said processor obtains a current time value from said time source upon initialization of said device, compares said current time value to said plurality of time values, retrieves a corresponding particular time-based initialization default value from said plurality of time-based initialization default values, and uses said particular time-based initialization default value to retrieve particular information for outputting to said output device or to configure the device.

15. The electronic information retrieval device of claim 14, further comprising a user input device and wherein a user input triggers said initialization.

16. The electronic information retrieval device of claim 14, wherein said electronic information retrieval device further comprises a power supply and wherein said initialization occurs when said power supply first provides electrical power to said electronic device.

17. The electronic information retrieval device of claim 14, wherein said plurality of time values and said plurality of time-based initialization default values are user-settable.

18. A computer-implemented default initialization method for an electronic information retrieval device, comprising the steps of:

obtaining a current time value upon initialization of an application stored in a memory coupled to the device, wherein the application is a web browser;

comparing said current time value to a plurality of time values;

retrieving a corresponding resource locator from a plurality of resource locators if said current time value matches a predetermined time value of said plurality of time values; and configuring the web browser to use said corresponding resource locator to retrieve information stored remotely from the information retrieval device for output to an output device.

19. The computer implemented default initialization method of claim 18, wherein said corresponding resource locator is a Uniform Resource Locator (URL).

20. The computer implemented default initialization method of claim 18, wherein said information is a web page.

21. The computer implemented default initialization method of claim 20, wherein said web page includes sports, weather, stock, entertainment, and/or news information.

22. The computer implemented default initialization method of claim 18, wherein said plurality of time values and said plurality of resource locators are learned by said electronic information retrieval device from an initialization use pattern corresponding to user-selected initialization values.

23. The computer implemented default initialization method of claim 18, wherein said initialization of said web browser at a power on.

* * * * *

UNITED STATES PATENT AND TRADEMARK OFFICE

CERTIFICATE OF CORRECTION

PATENT NO. : 7,003,654 B2
APPLICATION NO. : 09/931141
DATED : February 21, 2006
INVENTOR(S) : John M. Baron It is certified that error appears in the above-identified patent and that said Letters Patent is hereby corrected as shown below:

In column 6, line 21, in Claim 1, delete "browsers" and insert -- browser --, therefor.

In column 7, line 4, in Claim 14, after "pattern" delete ",".

In column 7, line 8, in Claim 14, after "values" insert -- is --.

In column 8, line 33, in Claim 23, after "browser" insert -- occurs --.

Signed and Sealed this

Twenty-third Day of June, 2009

JOHN DOLL
*Acting Director of the United States Patent and Trademark Office*